March 24, 1959  M. M. SEELOFF  2,879,374
WELDING CURRENT CONDUCTOR BARS
Filed Nov. 6, 1956  2 Sheets-Sheet 1

INVENTOR
MELVIN M. SEELOFF
BY Francis J. Klempay
ATTORNEY

March 24, 1959 M. M. SEELOFF 2,879,374
WELDING CURRENT CONDUCTOR BARS
Filed Nov. 6, 1956 2 Sheets-Sheet 2

INVENTOR
MELVIN M. SEELOFF
BY Francis J. Klempay
ATTORNEY

United States Patent Office

2,879,374
Patented Mar. 24, 1959

2,879,374

WELDING CURRENT CONDUCTOR BARS

Melvin M. Seeloff, Warren, Ohio, assignor to The Taylor-Winfield Corporation, Warren, Ohio, a corporation of Ohio Application November 6, 1956, Serial No. 620,678

1 Claim. (Cl. 219—89)

This invention relates generally to apparatus for the conduction of electrical currents and more particularly to improved welding current conductor bars for transferring low voltage-high amperage electrical currents from the secondary of a stationary welding transformer to a movable electrode assembly.

As will be understood by those skilled in this art, electric resistance welding machines usually comprise a pair of opposed electrode assemblies adapted to grip workpieces therebetween. To allow the manipulation and loading of workpieces one of the electrode assemblies is movable with respect to the other assembly and one of the problems encountered in welding machines of this type is transferring the current from the stationary transformer to the movable electrode assembly. This transfer of the welding energy should take place without appreciable losses due to resistive drop, etc., and the conducting means must be able to withstand sustained and continuous usage.

Heretofore it has been proposed to use various types of flexible conductors, such as layered current conducting bands or braided conductive material, or movable but internally rigid current conducting bars for effecting this transfer. The apparatus of the present invention is of the second type wherein current conductor bars are utilized to electrically interconnect the welding transformer and the movable electrode assembly.

It is the primary object of this invention to provide improved welding current conductor bars for the purpose described which are characterized by their extreme simplicity in manufacture, construction and utilization. It will be observed upon further study of the specification and drawing that the apparatus of the present invention eliminates many parts which have characterized prior art apparatus.

Yet a further object of the invention is to provide conductor bars for the purpose indicated which allow complete freedom of movement of the movable welding electrode.

Another object of the invention is to provide welding current conductor bars which embody resilient means in a novel and improved manner to insure that proper electrical contact is maintained at all times.

A further object of the invention is to provide apparatus of the character described well adapted for sustained and continuous usage.

The above, as well as other objects and advantages of the invention, will become apparent upon further consideration of the following detailed specification and accompanying drawing wherein there is described and shown certain preferred embodiments of the invention.

Figure 1:
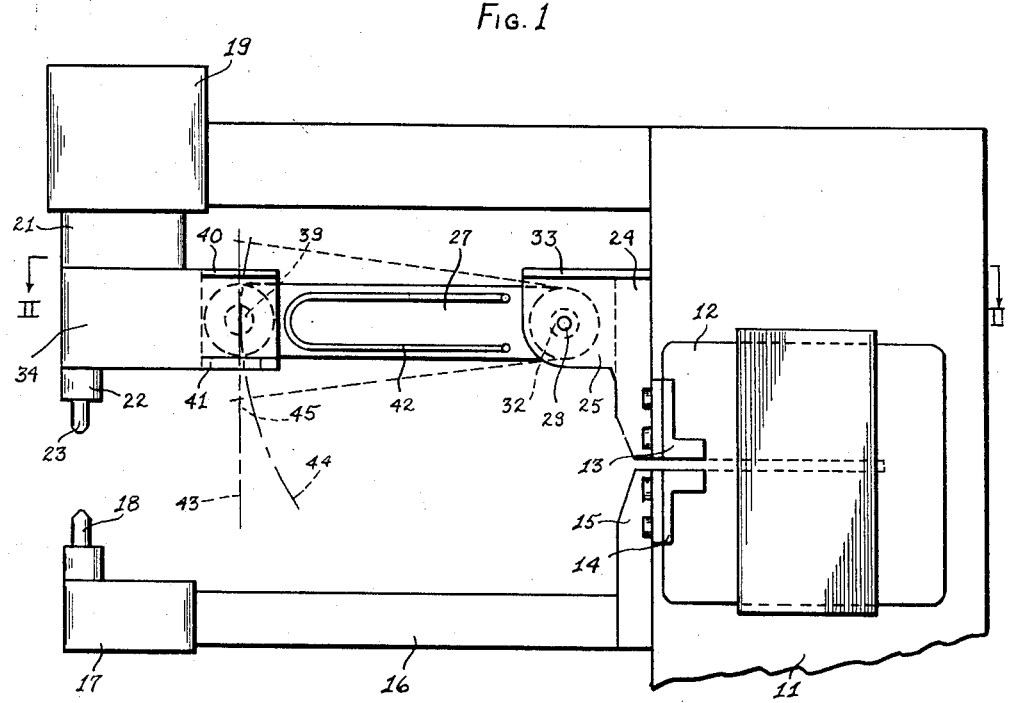
Figure 1 is a fragmentary side elevational view of welding mechanism embodying my improved welding current conductor bars.
Figure 2:
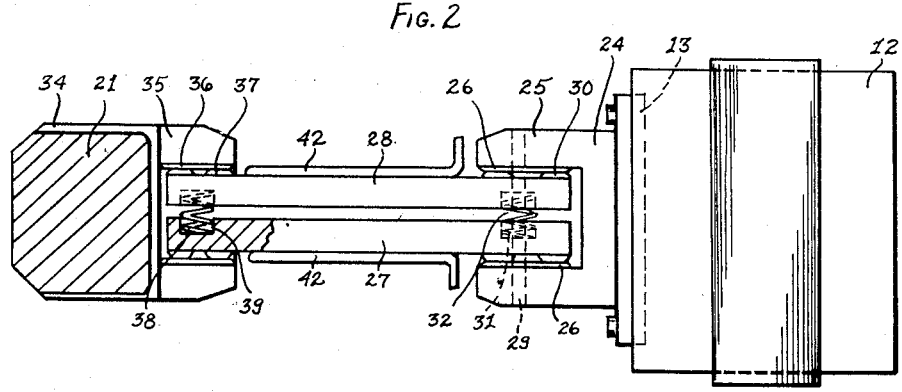
Figure 2 is a plan view, partially in section, and with the retaining plates removed, taken along the section line 11—11 of Figure 1.

Referring now to the drawing, and initially to Figures 1 and 2 thereof, there is shown in somewhat schematic detail a resistance welding machine embodying the improvements of the present invention and which comprises a frame 11 adapted to support a welding transformer 12. This type of transformer is well known in the art and includes a primary winding of a substantial number of turns, a core structure and a secondary winding of relatively few turns of heavy copper conductor or other suitable conductive material. The ends of the secondary winding are attached to the forwardly extending terminal brackets 13 and 14 which, of course, are electrically separated from each other.

Bolted or otherwise attached to the lower bracket 14 is a current conductive fitting 15 which is in electrical communication with horn 16 extending outwardly of the frame 11. Mounted on the outer end of the horn 16 is a stationary electrode mounting block 17 which carries a stationary or fixed electrode 18. The welding machine is constructed so that the welding current is confined to the terminal 14, fitting 15, horn 16, electrode mounting block 17 and the stationary electrode 18 as is the preferred practice in the art.

Mounted on the frame 11 near the top edge thereof is a fluid cylinder 19 having a piston rod, not specifically shown, which is adapted to vertically reciprocate a welding ram 21. Carried on the lower end of the ram 21 is an electrode mounting block 22 which mounts a movable electrode 23. Thus, upon proper actuation of the fluid cylinder 19 the movable electrode 23 is caused to move toward or away from the fixed or stationary electrode 18 as is readily apparent.

In order to transfer welding current from the terminal bracket 13 of the welding transformer 12 to the movable electrode 23 a terminal fitting 24 is mounted on the forward face of the terminal bracket 13. This terminal fitting is made of suitable conductive material, preferably copper, and has an integral and forwardly extending mounting clevis 25. As shown in Figure 2 of the drawing the inner side surfaces of this clevis are faced with silver current conducting contacts 26.

Pivotally received in the clevis 25 are a pair of forwardly extending and generally rectangular current conductive bars 27 and 28 which are preferably made of copper or other like material. A pivot pin 29 extends through the mounting clevis and journals these current conducting bars for pivotal movement which each have the outer peripheral end portions thereof faced with silver contact portions 30. As best shown in Figure 2 of the drawing both of the rectangular bars 27 and 28 are counterbored on their internal faces to define a transversely extending recess 31 which serves as a guide and a container for a compression spring 32 which encircles the pivot pin 29 and is adapted to continuously urge the bars 27 and 28 away from each other in order that good electrical contact is afforded between the contact portions 26 and 30 at all times. It is noted that the spring 32 insures contact between the contact portions 26 and 30 irrespective of the pivotal positions of the bars 27 and 28. To exclude dust and other objectionable material a dust shield plate 33 is provided to cover the top opening defined by the clevis 25.

A somewhat similar arrangement is employed for connecting the bars 27 and 28 to the movable welding ram 21 of the welding machine. Mounted on this ram in circumscribing relation therewith is a copper terminal fitting 34 having rearwardly extending projections which define a mounting clevis 35. The interior side walls of this clevis are faced with silver contacts 36 adapted to cooperate with silver contact portions 37 on the forward end of the conductor bars 27 and 28. An annular recess is provided in the forward end of each of these bars thereby defining a recess 38 holding a second compression spring 39 whose function is to continuously urge the silver contact portions 36 and 37 into proper current conducting relation. The bottom and top openings defined by the clevis 35 are closed by the retaining plates 40 and 41 which not only protect the assembly from dust but also prohibit undue and undesirable movement of the current conducting bars 27 and 28. It will be noted that no pivot pin or other like support is provided for the front end of the current conductive bars 27 and 28 in order that the movable electrode 23 can be moved in a vertical plane as distinguished from a curved or arcuate path of travel.

It will be apparent from inspection of Figure 1 of the drawing that the silver contact portions 30 and 37 mounted on opposite ends of the current conductive bars 27 and 28 are in essence annular rings or washers.

To provide proper cooling of the current conductive bars the exposed outer faces thereof mount generally U-shaped water cooling tubes 42 which may be attached by welding or other expedient means and have outwardly turned end portions for connection with suitable conduits leading to a source of coolent, not shown. Although this specific construction of the cooling means is extremely simplified and highly efficient it should be understood that the current conductive bars 26 and 28 may be drilled and worked to provide internal passageways for cooling fluid if desired. From the above description it will be seen that current is caused to flow from terminal bracket 13, the terminal fitting 24, across the contact portions 26 and 30 to the current conducting bars 27 and 28, across the silver contact portions 36 and 37 to the terminal fitting 34 mounted on the ram 21, the movable electrode 23, stationary electrode 18, horn 16, fitting 15, terminal bracket 14 and back to the terminal bracket 13 via the secondary winding, not shown, of the welding transformer 12.

In the operation of the apparatus described above it will be assumed that the movable electrode 23 and welding ram 21 are initially in the position shown in Figure 1 of the drawing. If it is desired to complete a weld, workpieces, not shown, are positioned properly with respect to the stationary electrode 18 and fluid is supplied to the upper end of cylinder 19 to move electrode 23 into pressure contact with the workpieces and the stationary electrode 18. It is desirable that the electrode 23 be movable in a vertical plane so that the electrodes are always properly aligned irrespective of the separation between these members in order that different sized workpieces can be welded. If this condition is to be fulfilled the terminal fitting 34 must also move in a vertical plane as defined by a vertical line 43. However, since the current conducting bars 27 and 28 are pivotally attached to the clevis 25 of fitting 24 the forward ends of these bars will move in an arc as represented by broken line 44. Thus it will be seen that when the electrode 23 is moved to the down position the forward ends of the current conductive bars 27 and 28 will be displaced horizontally by an amount equal to the distance between the lines 43 and 44 as represented by the reference numeral 45. By properly dimensioning the size of the clevis 35 of terminal fitting 34, the area of silver contact portions 36 and 37 and the length of the current conductive bars 27 and 28 a slip fitting is provided which allows the above described relative horizontal movement of the bars 27 and 28 and the terminal fitting 34.

One of the most important aspects of the apparatus described above is the utilization of the compression springs 32 and 39 which always hold the ends of the bars in pressure contact with the silver contact portions of the clevises 25 and 35. In this manner a positive current conducting means is always operative to connect the stationary secondary terminal of the welding transformer with the movable electrode assembly.

Figure 3:
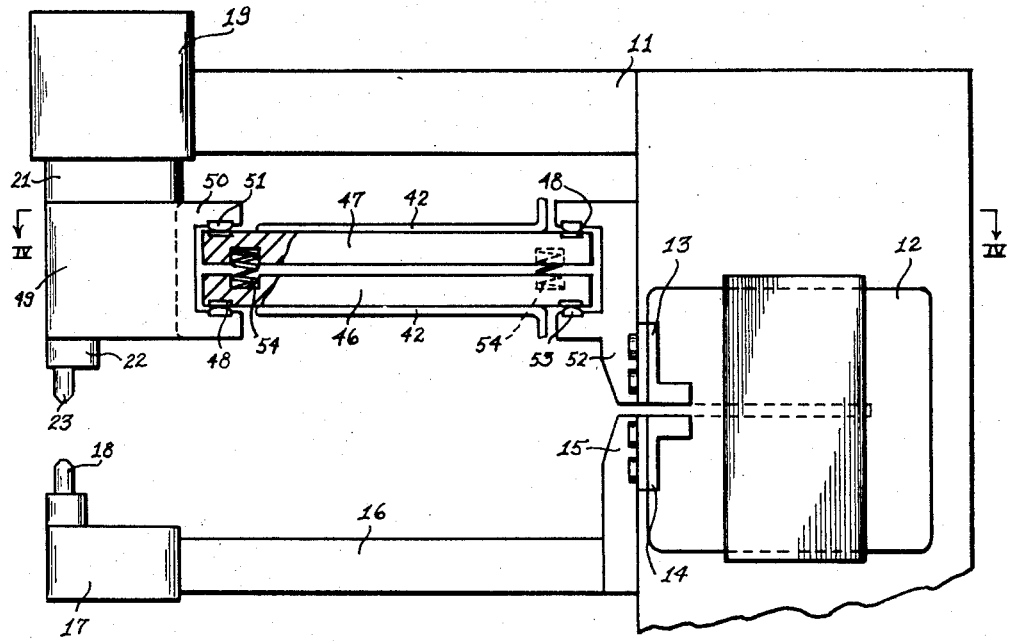
Figure 3 is a fragmentary side view of another embodiment of my welding current conductor bars constructed in accordance with the teachings of the invention.
Figure 4:
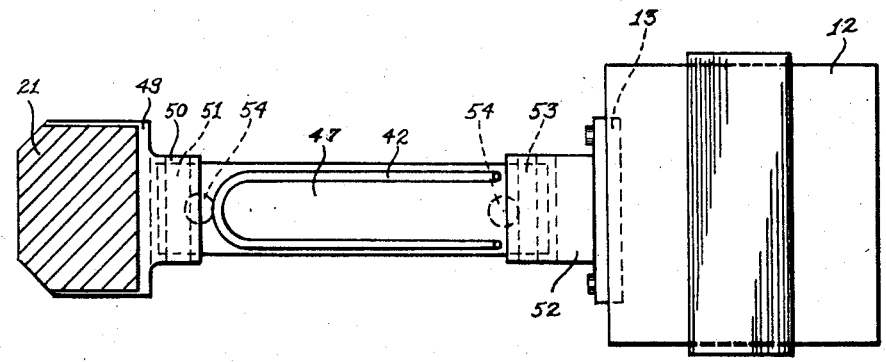
Figure 4 is a top sectional view taken along the section line IV—IV of Figure 3.

Referring now to Figures 3 and 4 of the drawing, there is shown another embodiment constructed in accordance with the teachings of the present invention. In the interest of brevity and to avoid unnecessary repetition in the description, all component parts which are identical to those previously described are indicated by the same reference numerals as hereinbefore indicated. In this embodiment a pair of current conductive bars 46 and 47 of generally rectangular shape are displaced ninety degrees from those shown in Figure 1 and have the silver contact portions 48 near the ends thereof on the top and bottom face portions, respectively. A terminal fitting 49 mounted on welding ram 21 has a mounting clevis 50 with rearwardly extending top and bottom legs faced with silver contact portions 51 on the internal surfaces thereof adapted to cooperate with the silver contact areas 48 on the forward ends of the bars 46 and 47. Attached to the stationary terminal bracket 13 of the welding transformer is a terminal fitting 52 having a forwardly extending clevis lined with silver contact portions 53. Compression springs 54 are mounted in appropriate recesses near the ends of the bars 46 and 47 whose function is to insure positive conductive contact between adjacent silver contact portions of the bars and terminal fittings 49 and 52. It will be observed that no attachment means, such as pivot pins, for example, are needed since the springs provide sufficient biasing pressure to maintain electrical contact and this also affords a sliding contact so that the movable electrode 23 may be moved in a vertical plane.

The silver contact portions on the clevises of the terminal fittings will be slightly larger than the contact portions on the ends of the current conductive bars in order to provide sufficient contact areas when the movable electrode is in any desired vertical position. The dimensions of the current conductive bars will, of course, depend upon the cross sectional area required to carry the welding current and the horizontal separation between the welding transformer and the movable electrode.

It should thus be apparent that I have accomplished the objects initially set forth by providing improved welding current conductor bars for transferring current from a stationary terminal of a welding transformer to a movable electorde assembly. The current conductive bars are of the utmost simplicity in construction and design and allow vertical movement of the movable electrode in a desired manner.

Since many changes may be made in the embodiments shown and described herein reference should be had to the following appended claim in determining the scope of the invention.

I claim:

A welding machine of the type having a frame, a fixed electrode and a vertically movable electrode, stationary current conducting means mounted on said frame of said welding machine, a movable electrode assembly carrying said vertically movable electrode and movable in a single vertical plane, said movable electrode assembly being mounted from said frame in horizontally spaced relation with respect to said stationary current conducting means, an electrical system for transferring high amperage welding current from said stationary current conducting means to said movable electrode assembly, said electrical system comprising a pair of generally rectangular horizontally extending current conductor bars disposed in parallel side-by-side relation, said bars having adjacent inner flat side surfaces and outer flat side surfaces, said stationary current conducting means comprising first mounting means having spaced walls contacting one set of ends of said bars on said outer flat surfaces thereof and preventing outward movement of said bars, said movable electrode assembly comprising second mounting means having spaced walls contacting the other set of ends of said bars on said flat outer surfaces thereof and preventing outward movement of said bars, the meeting surfaces of said conductor bars and said first and said second mounting means being faced with highly conductive material to provide sliding contact areas, each of said conductor bars having a depression on the inner side flat surface thereof adjacent each end thereof, said depressions defining aligned recesses near each of said set of ends of said conductor bars when the same are in said parallel side-by-side relation, and yielding means comprising a pair of compression springs extending transversely of said bars and received within said recesses.

References Cited in the file of this patent
UNITED STATES PATENTS

| | | |
|---|---|---|
| 1,804,590 | Brown | May 12, 1931 |
| 2,083,379 | Hill | June 8, 1937 |
| 2,529,634 | Sciaky | Nov. 14, 1950 |
| 2,600,582 | Sciaky | June 17, 1952 |
| 2,688,071 | Wright | Aug. 31, 1954 |